(12) United States Patent
Tsafaridis

(10) Patent No.: US 11,429,916 B2
(45) Date of Patent: Aug. 30, 2022

(54) FACILITY FOR PROCESSING STEEL

(71) Applicant: Carego Tek Inc., Burlington (CA)

(72) Inventor: Demetrius Tsafaridis, Burlington (CA)

(73) Assignee: Carego Tek Inc.

( * ) Notice: Subject to any disclaimer, the term of this patent is extended or adjusted under 35 U.S.C. 154(b) by 822 days.

(21) Appl. No.: 16/278,871

(22) Filed: Feb. 19, 2019

(65) Prior Publication Data
US 2019/0263612 A1 Aug. 29, 2019

Related U.S. Application Data

(60) Provisional application No. 62/635,850, filed on Feb. 27, 2018.

(51) Int. Cl.
| | | |
|---|---|---|
| *G06Q 10/08* | (2012.01) | |
| *B66C 13/00* | (2006.01) | |
| *B65G 57/20* | (2006.01) | |
| *B65G 1/16* | (2006.01) | |

(52) U.S. Cl.
CPC ............. *G06Q 10/08* (2013.01); *B65G 1/16* (2013.01); *B65G 57/20* (2013.01); *B66C 13/005* (2013.01); *B65G 2201/0232* (2013.01)

(58) Field of Classification Search
CPC ...... B65G 1/1378; B65G 1/1365; B65G 1/16; B65G 2201/0232; G06G 10/08
See application file for complete search history.

(56) References Cited

U.S. PATENT DOCUMENTS

| | | | |
|---|---|---|---|
| 4,503,978 A | 3/1985 | Smit et al. | |
| 4,642,017 A | 2/1987 | Fenn | |
| 4,796,209 A | 1/1989 | Burk | |
| 5,411,151 A * | 5/1995 | Sasada | B65G 1/1373 209/912 |

(Continued)

FOREIGN PATENT DOCUMENTS

| | | |
|---|---|---|
| CA | 1072919 | 3/1980 |
| CA | 2584306 | 3/2007 |

(Continued)

OTHER PUBLICATIONS

Tsafaridis, Demetrius; Ex Parte Quayle Action for U.S. Appl. No. 14/395,203, filed Oct. 17, 2014, dated Aug. 31, 2018, 5 pgs.

(Continued)

*Primary Examiner* — Kaitlin S Joerger
(74) *Attorney, Agent, or Firm* — Taylor English Duma LLP

(57) ABSTRACT

Facilities for processing steel. One facility includes a line for producing packages; a plurality of stackable cassettes for receiving packages; a splitter subfacility; automated transfer apparatus; and an automated overhead crane. The line may be a slitting line with the packages being coils of steel, or a cut-to-length line with the packages being stacks of steel sheets. A premises of the facility comprises a loading area in which packages from the line are loaded into cassettes, a storage area in which cassettes are stored, and a transition zone including at least one transfer position. The automated transfer apparatus moves packages and/or cassettes between the transfer position and the splitter subfacility. The automated overhead crane moves cassettes between the storage area, the loading area, and the transition zone.

6 Claims, 13 Drawing Sheets

(56) References Cited

U.S. PATENT DOCUMENTS

| | | | |
|---|---|---|---|
| 5,953,234 A * | 9/1999 | Singer | B65G 1/1378 700/214 |
| 5,996,316 A * | 12/1999 | Kirschner | B65G 1/1378 53/238 |
| 9,424,749 B1 * | 8/2016 | Reed | G08G 1/01 |
| 9,514,430 B2 * | 12/2016 | Miette | G06Q 10/083 |
| 9,522,783 B2 | 12/2016 | Boni | |
| 9,828,193 B2 | 11/2017 | Boni et al. | |
| 10,160,598 B2 | 12/2018 | Tsafaridis et al. | |
| 2005/0226713 A1 | 10/2005 | Tsafaridis | |
| 2006/0104800 A1 | 5/2006 | Armbruster | |
| 2007/0007354 A1 | 1/2007 | Mueller | |
| 2007/0039909 A1 | 2/2007 | Dement | |
| 2008/0255699 A1 | 10/2008 | Hama et al. | |
| 2011/0315765 A1 | 12/2011 | Schantz et al. | |
| 2012/0179632 A1 | 7/2012 | Pienta et al. | |
| 2015/0166272 A1 | 6/2015 | Pankratov | |
| 2015/0232274 A1 | 8/2015 | Tsafaridis | |
| 2015/0298907 A1 | 10/2015 | Boni | |
| 2015/0378345 A1 * | 12/2015 | Winkler | B65G 1/1378 700/216 |
| 2017/0081136 A1 | 3/2017 | Boni | |
| 2017/0320671 A1 * | 11/2017 | Rasi | B65G 17/323 |

FOREIGN PATENT DOCUMENTS

| | | |
|---|---|---|
| CA | 2795624 | 5/2014 |
| CA | 2802429 | 7/2014 |
| CA | 2807309 | 7/2014 |
| DE | 202005020657 | 5/2006 |
| EP | 0659660 | 6/1995 |
| EP | 1577231 | 9/2005 |
| FR | 2669904 | 6/1992 |
| JP | 2000255785 | 9/2000 |
| JP | 2008195535 | 8/2008 |
| WO | 0214203 | 2/2002 |
| WO | 2008119885 | 10/2008 |
| WO | 2011131836 | 10/2011 |
| WO | 2013059366 | 4/2013 |
| WO | 2014066976 | 5/2014 |
| WO | 2014066989 | 5/2014 |

OTHER PUBLICATIONS

Tsafaridis, Demetrius; Final Office Action for U.S. Appl. No. 14/395,203, filed Oct. 17, 2014, dated Jun. 6, 2017, 5 pgs.
Tsafaridis, Demetrius; Final Office Action for U.S. Appl. No. 14/395,203, filed Oct. 17, 2014, dated Dec. 7, 2017, 6 pgs.
Tsafaridis, Demetrius; Final Office Action for U.S. Appl. No. 14/395,203, filed Oct. 17, 2014, dated Aug. 23, 2018, 6 pgs.
Tsafaridis, Demetrius; Final Office Action for U.S. Appl. No. 14/395,203, filed Oct. 17, 2014, dated Sep. 12, 2016, 5 pgs.
Tsafaridis, Demetrius; International Preliminary Report on Patentability for PCT/CA2013/000329, filed Apr. 5, 2013, dated May 5, 2015, 7 pgs.
Tsafaridis, Demetrius; International Search Report and Written Opinion for PCT/CA2013/000329, filed Apr. 5, 2013, dated Jul. 18, 2013, 4 pgs.
Tsafaridis, Demetrius; Issue Notification for U.S. Appl. No. 14/395,203, filed Oct. 17, 2014, dated Dec. 5, 2018, 1 pg.
Tsafaridis, Demetrius; Non-Final Office Action for U.S. Appl. No. 14/395,203, filed Oct. 17, 2014, dated Mar. 28, 2016, 15 pgs.
Tsafaridis, Demetrius; Non-final Office Action for U.S. Appl. No. 14/395,203, filed Oct. 17, 2014, dated Feb. 27, 2017, 11 pgs.
Tsafaridis, Demetrius; Non-Final Office Action for U.S. Appl. No. 14/395,203, filed Oct. 17, 2014, dated Mar. 14, 2018, 10 pgs.
Tsafaridis, Demetrius; Non-Final Office Action for U.S. Appl. No. 14/395,203, filed Oct. 17, 2014, dated Aug. 17, 2017, 15 pgs.
Tsafaridis, Demetrius; Notice of Allowance for U.S. Appl. No. 14/395,203, filed Oct. 17, 2014, dated Oct. 2, 2018, 7 pgs.
Tsafaridis, Demetrius; Restriction Requirement for U.S. Appl. No. 14/395,203, filed Oct. 17, 2014, dated Dec. 30, 2015, 6 pgs.
Tsafaridis, Demetrius; Supplemental Notice of Allowance for U.S. Appl. No. 14/395,203, filed Oct. 17, 2014, dated Oct. 19, 2018, 7 pgs.
Tsafaridis, Demetrius; U.S. Provisional Application entitled: Warehouse-Related Method, having U.S. Appl. No. 61/721,865, filed Nov. 2, 2012, 39 pgs. (Copy not required—see MPEP § 609.04(a) (citing "Waiver of the Copy Requirement").).
Boni, Martin; International Preliminary Report on Patentability for PCT/CA2013/000935, filed Nov. 1, 2013, dated May 5, 2015, 7 pgs.
Boni, Martin; International Search Report and Written Opinion for PCT/CA2013/000935, filed Nov. 1, 2013, dated Feb. 18, 2014, 5 pgs.
Boni, Martin; Issue Notification for U.S. Appl. No. 14/395,206, filed Oct. 17, 2014, dated Nov. 30, 2016, 1 pg.
Boni, Martin; Non-Final Office Action for U.S. Appl. No. 14/395,206, filed Oct. 17, 2014, dated Apr. 20, 2016, 19 pgs.
Boni, Martin; Notice of Allowance for U.S. Appl. No. 14/395,206, filed Oct. 17, 2014. dated Aug. 22, 2016, 10 pgs.
Boni, Martin; Restriction Requirement for U.S. Appl. No. 14/395,206, filed Oct. 17, 2014, dated Feb. 16, 2016, 6 pgs.
Boni, Martin; U.S. Provisional Application entitled: Warehouse-Related Method and Facility, having U.S. Appl. No. 61/835,800, filed Jun. 17, 2013, 52 pgs. (Copy not required—see MPEP § 609.04(a) (citing "Waiver of the Copy Requirement").).
Boni, Martin; U.S. Provisional Application entitled: Warehouse-Related Method and Facility, having U.S. Appl. No. 61/897,289, filed Oct. 30, 2013, 49 pgs. (Copy not required—see MPEP § 609.04(a) (citing "Waiver of the Copy Requirement").).
Boni, Martin; International Preliminary Report on Patentability for PCT Application No. PCT/CA2015/050366, filed Apr. 30, 2015, dated Nov. 15, 2016, 4 pgs.
Boni, Martin; Issue Notification for U.S. Appl. No. 15/311,094, filed Nov. 14, 2016, dated Nov. 8, 2017, 1 pg.
Boni, Martin; Notice of Allowance for U.S. Appl. No. 15/311,094, filed Nov. 14, 2016, dated Jun. 29, 2017, 25 pgs.
Boni, Martin; International Search Report and Written Opinion for PCT Application No. PCT/CA2015/050366, filed Apr. 30, 2015, dated Jul. 16, 2015, 6 pgs.
Carego Innovative Solutions, Inc.; Extended European Search Report for serial No. 13851586.1, filed Nov. 1, 2013, dated Sep. 26, 2016, 12 pgs.

* cited by examiner

FACILITY FOR PROCESSING STEEL

CROSS-REFERENCE TO RELATED APPLICATIONS

This application claims the benefit of U.S. Provisional Application No. 62/635,850, filed Feb. 27, 2018, entitled "FACILITY FOR PROCESSING STEEL," the entire disclosure of which is hereby incorporated herein by this reference.

BACKGROUND OF THE INVENTION

Field of Invention

The invention relates to the field of steel processing.

Background

Coiled steel is ubiquitously produced by steel mills around the world. These coils are often shipped to secondary processors at which various machines are situated.

A decoiler turns a coil of steel into a long ribbon of steel having the same width as the coil.

A slitter turns a long ribbon of steel into two or more narrow ribbons having the same length as the long ribbon.

A cut-to-length line turns a long ribbon of steel into a plurality of sheets of steel, each having the same width as the ribbon.

A coiler turns a long ribbon of steel into a coil having the same width as the ribbon.

Secondary processors serve a wide variety of customers with equally varied needs for product. To meet these needs, processors conventionally produce product as needed. Thus, if a customer has a need for a coil of a certain width and length, the processor draws a coil from inventory that can be cut and slit to that length and passes it through the machines to produce the coil. Similarly, if a customer has a need for sheets of steel of a certain width and length, the processor draws a coil from inventory that can be cut and slit into sheets of those widths and lengths and passes it through the machines as required.

At the end of each of the above process, the remaining material is coiled and returned to inventory using a manual overhead crane.

Coils are conventionally placed in a single layer in a storage area and stabilized against rolling movement.

Attention is given to the coil selected for slitting and cutting-to-length, with a view to minimizing, inter alia, material waste.

SUMMARY OF THE INVENTION

Forming one aspect of the invention is a facility comprising: a line, a plurality of stackable cassettes, premises, a splitter subfacility, automated transfer apparatus; and an automated overhead crane.

The line is for producing packages, the line being selected from slitting line and cut-to-length line, the packages being coils of steel when the line is the slitting line and being stacks of steel sheets when the line is the cut-to-length line.

In the plurality of stackable cassettes, each cassette is adapted to receive at least one package.

The premises include: a loading area for loading cassettes with packages; a storage area in which cassettes are stored; and a transition zone including at least one transfer position.

The splitter subfacility is for: receiving the contents of a cassette, removing and packaging for shipment at least some of such contents and returning the remainder; or receiving a cassette, removing and packaging for shipment at least some of such contents and returning the cassette.

The automated transfer apparatus for moving: the contents of a cassette disposed at the transfer position to the splitter subfacility and for moving a package from the splitter subfacility to a cassette in the transfer position; or for moving a cassette in the transfer position to the splitter subfacility and for moving a cassette from the splitter subfacility to the transfer position.

The automated overhead crane extends over the storage area, the loading area and the transition zone and is adapted to move cassettes therebetween.

According to another aspect, the facility can further comprise a manual overhead receiving crane for moving packages from the line to the loading area and be characterized in that it is adapted to arrest movement of the automated overhead crane in the loading area, if a human is in the loading area.

According to another aspect, the facility can comprise a receiving area for receiving packages from the line and the manual overhead crane can be adapted to move packages from the receiving area to the loading area.

According to another aspect, the facility can further comprise: a bay for receiving trucks; and a manual overhead shipping crane for moving packages from the splitting subfacility to the bay.

According to another aspect, the facility can comprise: a shipping area; and a manual overhead shipping crane for moving packages from the splitting subfacility to the shipping area.

According to another aspect, the line can be the cut-to-length line; and the automated apparatus can be for moving the contents of a cassette in the transfer position to the splitter subfacility and for moving a package from the splitter subfacility to a cassette in the transfer position.

According to another aspect, each cassette can have a plurality of apertures in the base thereof; and the transfer apparatus can comprise a conveyor and a lifter.

The conveyor has a plurality of rollers over which packages pass to and from the splitter subfacility. The lifter has a plurality of rollers, the rollers: having a lowered position whereat, when a cassette, loaded with a package, is at the transfer position, the rollers are beneath the package; and having a raised position, whereat the rollers protrude through the apertures of the cassette to form an extension of the conveyor adapted to deliver packages to the conveyor and to receive packages from the conveyor.

According to another aspect, each cassette can define a hollow and, at each end of the hollow, an aperture, the aperture providing for communication between the rollers of the lifter when in the raised position and the rollers of the conveyor.

DETAILED DESCRIPTION

Figure 1:
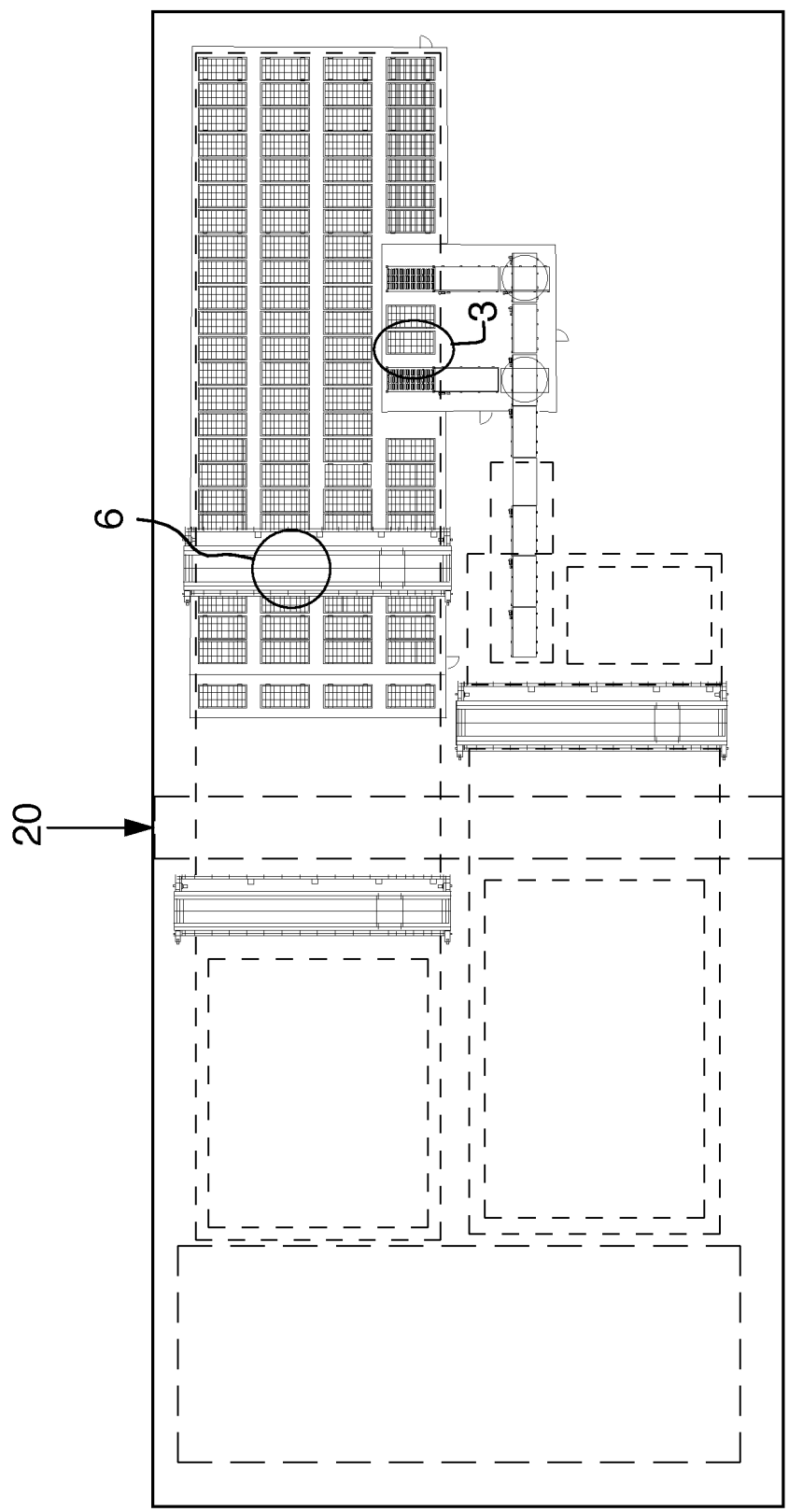
FIG. 1 is a plan view of a facility according to an exemplary embodiment of the invention.
Figure 2:
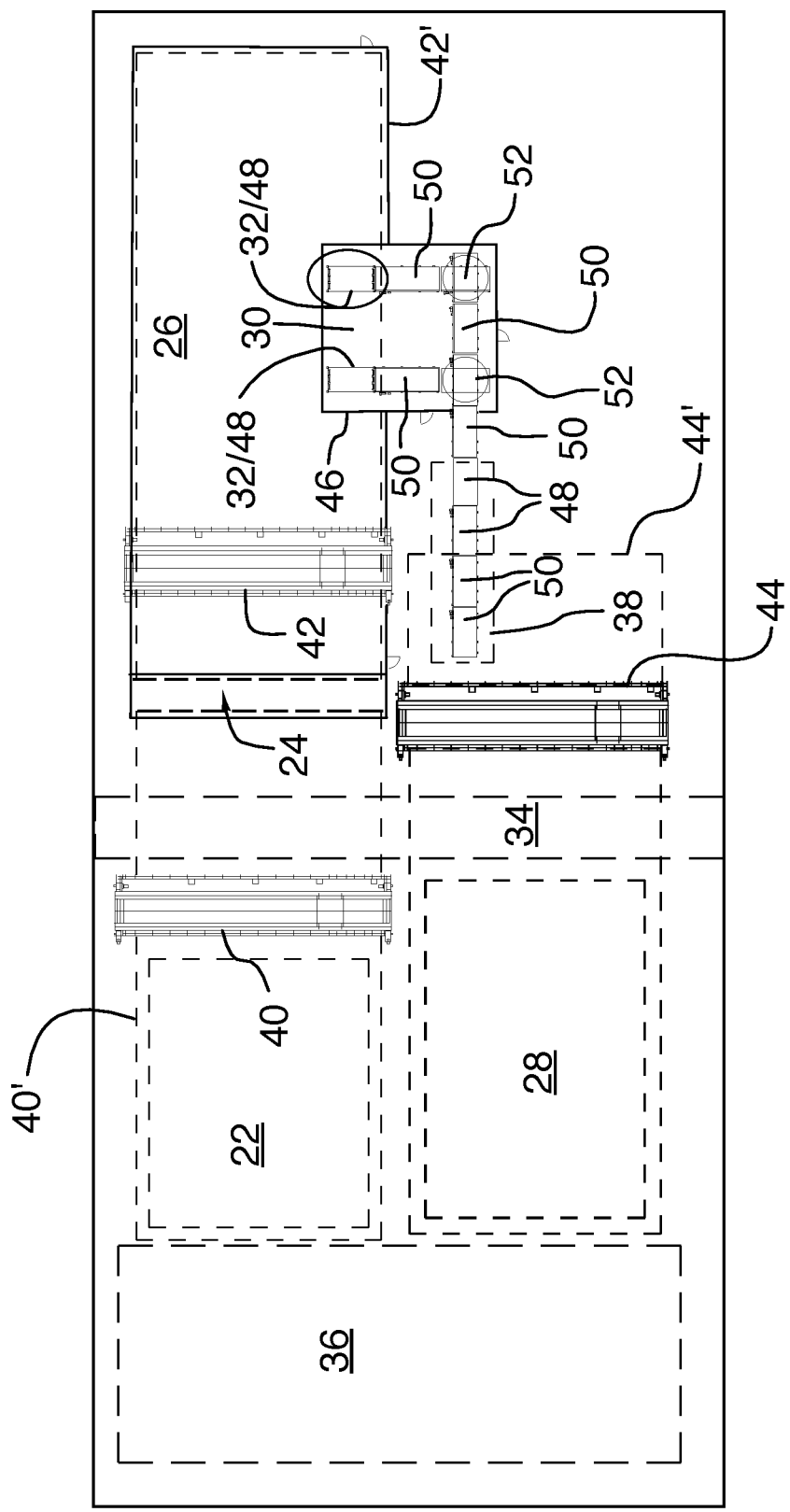
FIG. 2 is a view of the structure of FIG. 1 with portions removed.
Figure 3:
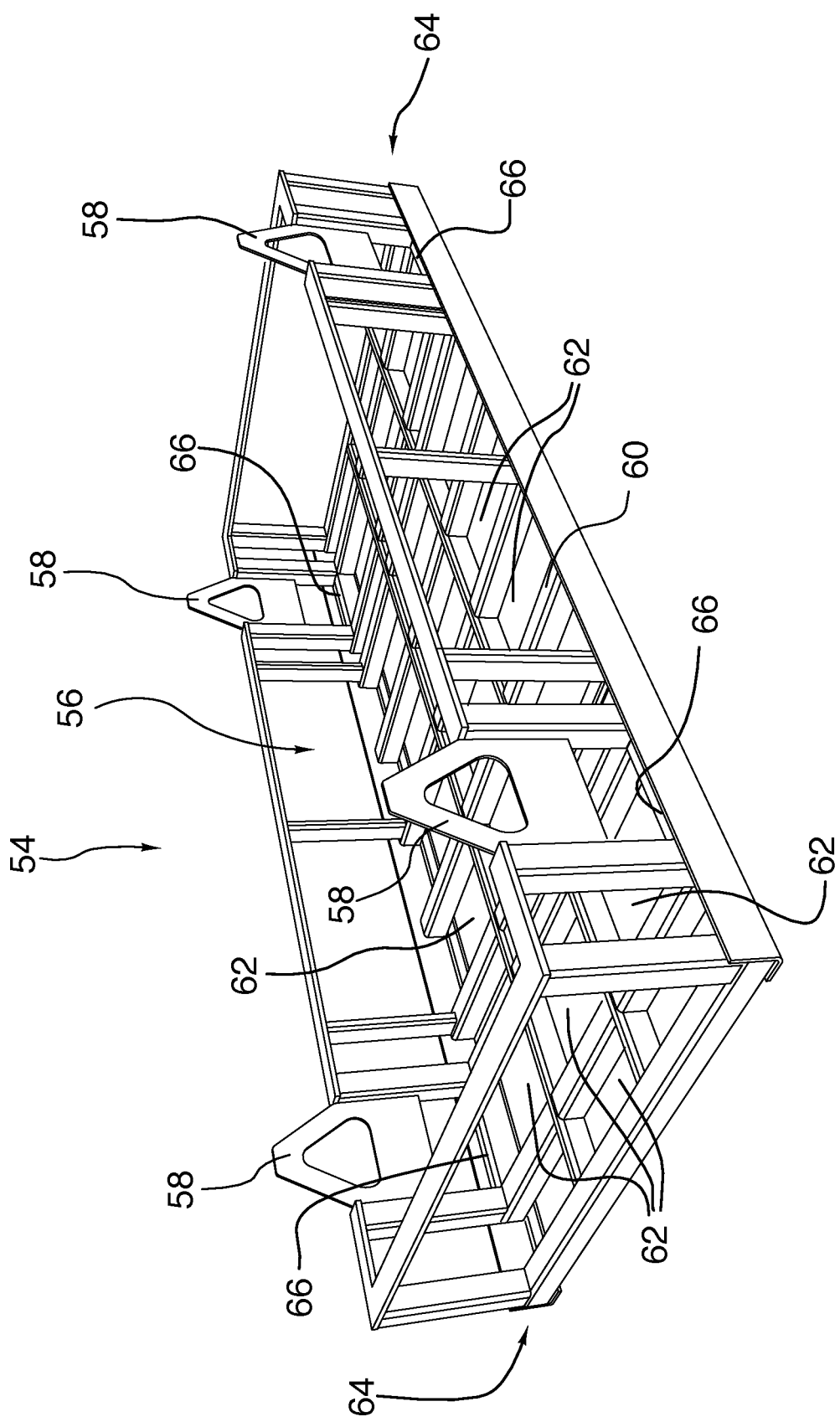
FIG. 3 is a perspective view of the structure of encircled area 3 of FIG. 1.

A facility 20 constructed according to an exemplary embodiment of the invention is shown in FIG. 1 and will be understood to include premises and equipment as shown in FIG. 2 and cassettes as shown in FIG. 3

Premises

The premises will be seen to include a package receiving area 22, a loading area 24, a cassette storage area 26, a shipping area 28, a transition zone 30 having at least one transfer position 32 and a truck bay 34.

Equipment

The equipment will be seen to comprise a line 36, a splitter subfacility 38, a manual overhead receiving crane 40, an automated storage crane 42, a manual overhead shipping crane 44 and an automated transfer apparatus 46.

The line 36 is a cut-to-length line for producing packages in the form of stacks of steel sheets from coils of steel.

The splitter subfacility 38 in this embodiment is defined by a pair of lifters 48 and a pair of conveyors 50.

Figure 4:
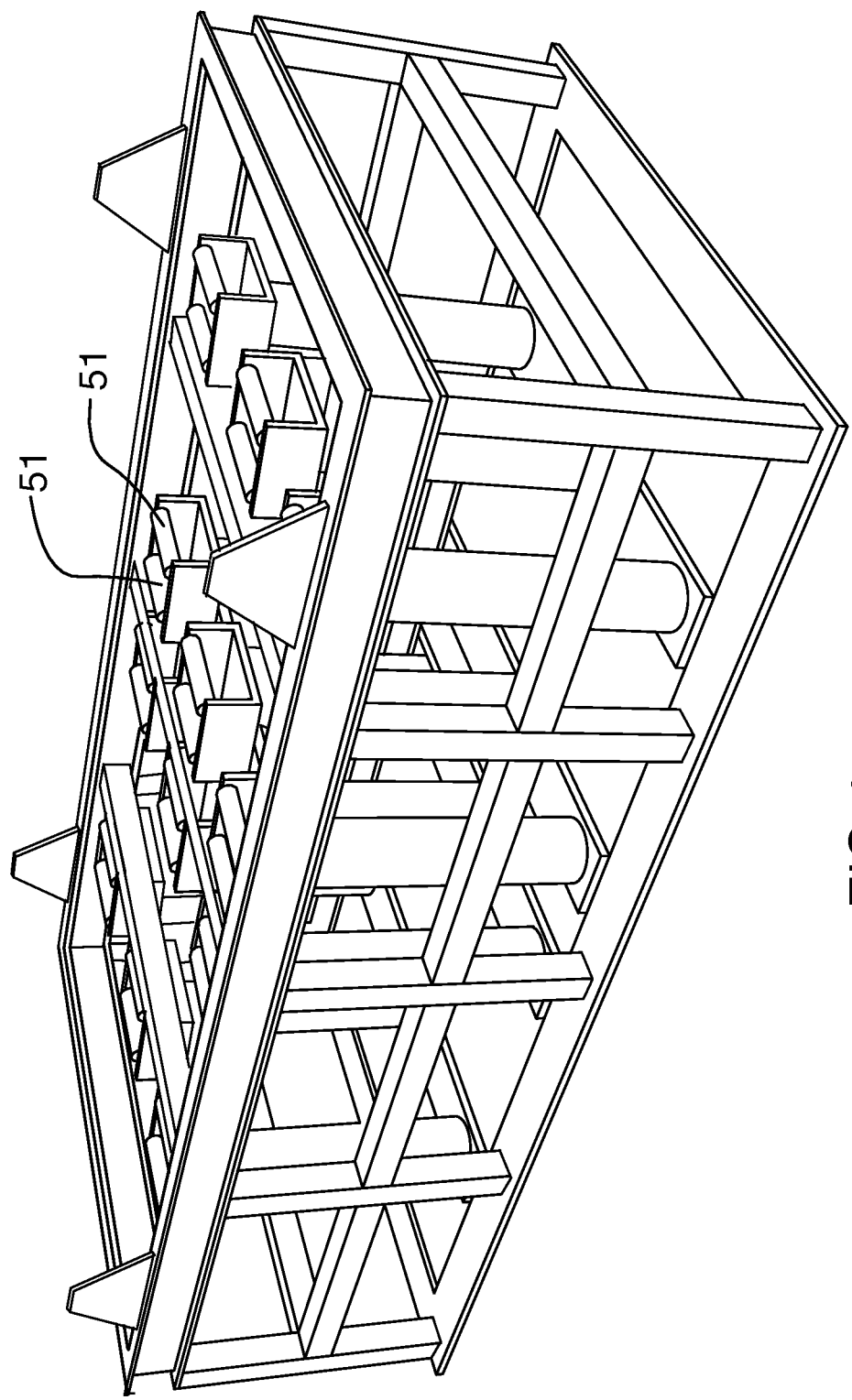
FIG. 4 is a perspective view of the structure of encircled area 4 of FIG. 2, in a lowered position.
Figure 5:
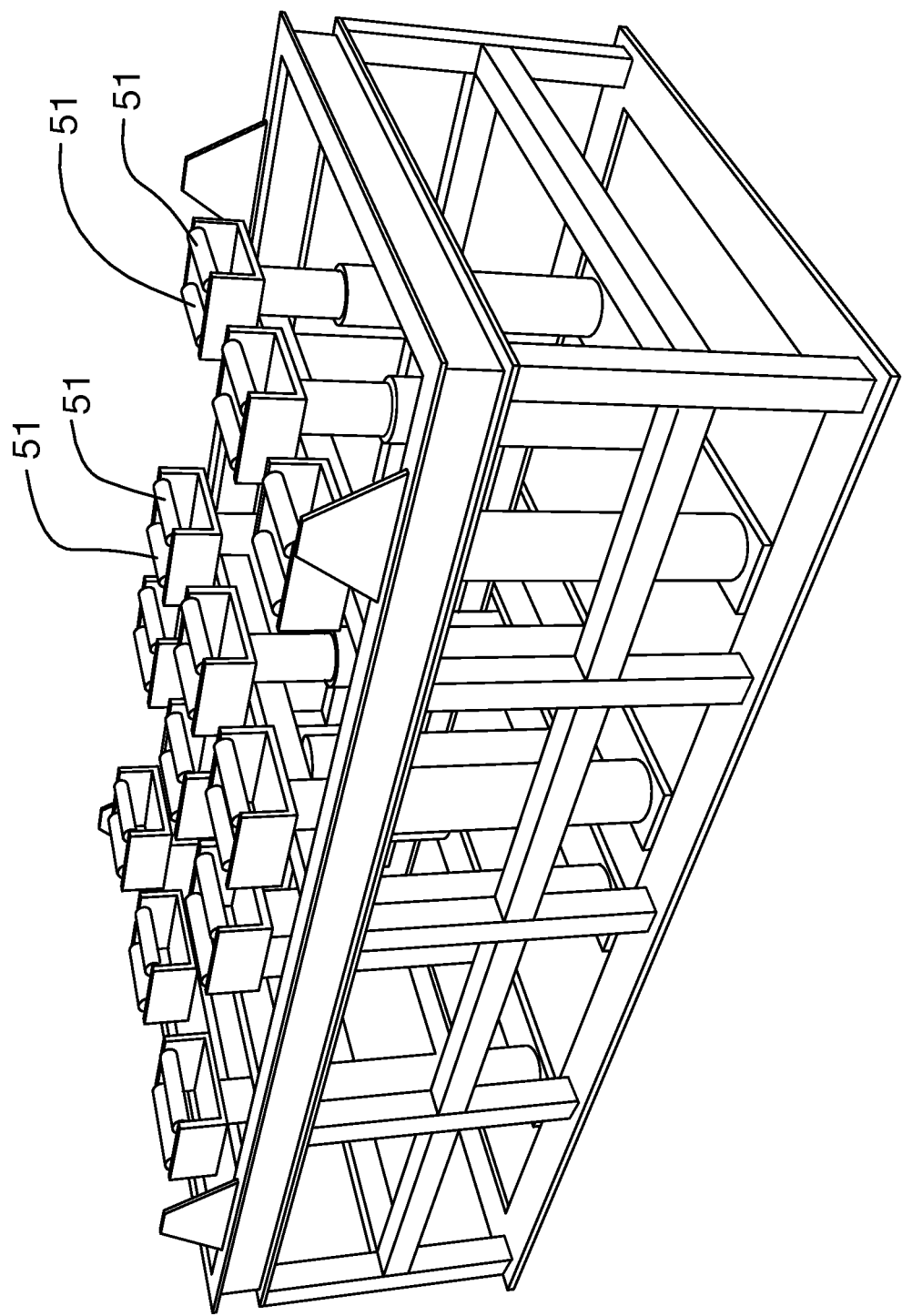
FIG. 5 is a view of the structure of FIG. 4 in a raised position.

The lifter will be seen in isolation in FIG. 4 and FIG. 5 and will be understood to include a plurality of rollers 51, each roller being adapted for driving rotational movement about its axis in fore and aft directions and the plurality of rollers being adapted for movement between a lowered position as shown in FIG. 4 and a raised position as shown in FIG. 5. The conveyor (not shown in detail) will be understood to function generally similarly to the lifter but with rollers fixed at an elevation intermediate the raised and lowered position of the lifter.

The manual overhead receiving crane extends from the receiving area 22 to the loading area 24 as indicated by dotted line 40'.

The automated overhead receiving crane 42 extends over the cassette storage 26 area, the transition zone 30 and the loading area 24 as indicated by dotted line 42'.

The manual overhead shipping crane 44 extends over the conveyors 50,50 of the splitter subfacility 38, the shipping area 28 and the truck bay 34, as indicated by dotted line 44'.

The automated transfer apparatus 46 includes a pair of lifters 48 as aforedescribed, a plurality of conveyors 50 as aforedescribed and a pair of turntables 52. The turntables (not shown in detail) will be understood to function generally similarly to the conveyors but the plurality of rollers are adapted for rotation about a vertical axis. The lifters are each positioned at one of the transfer positions. One of the turntables is provided for each lifter. One of the conveyors is provided for each lifter to couple said each lifter to the turntable provided therefor. A further one of the conveyors extends between the turntables and the final of the conveyors extends to the lifters of the splitter subfacility from one of the turntables.

Cassette

As seen in FIG. 3, the cassette 54 used in this embodiment: defines a rectangular hollow 56; has four peripherally spaced lugs 58; has a base 60 defining the bottom of the hollow in which a plurality of apertures 62 are defined; has, at each end of the hollow, a rectangular aperture 64; and has a plurality of receptacles 66 on the underside having a shape complementary with the lugs, to permit stacking.

Receiving

In operation, the cut-to-length line 36 delivers packages (stacks of sheets) to the receiving area 22. In this embodiment, packages are banded for transport in this area.

Loading

Banded packages are transported by overhead crane 44 to an empty cassette in the loading area 24. Banding is manually removed in this location.

Storage

Figure 6:
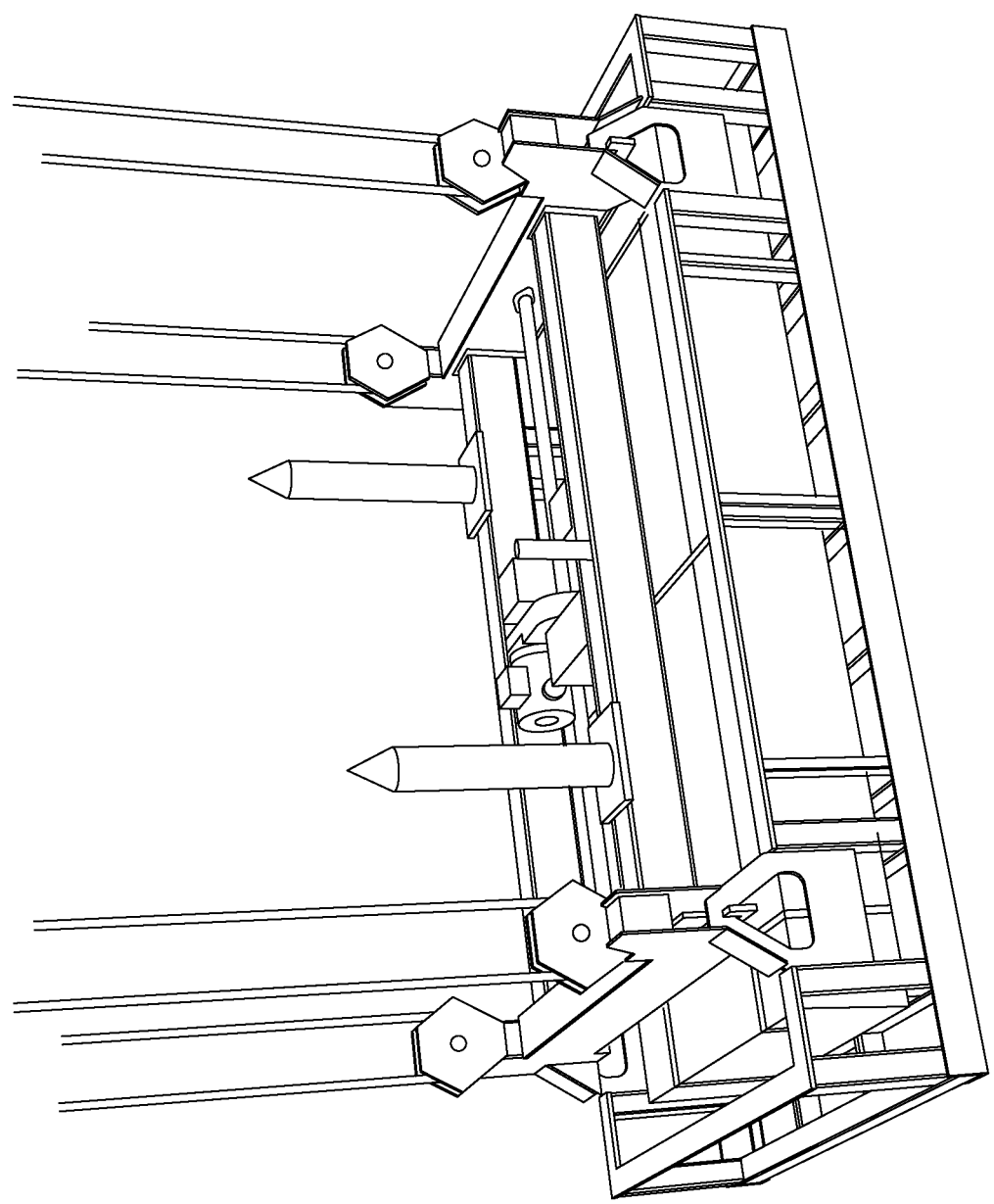
FIG. 6 is a perspective view of a portion of the structure of encircled area 6 of FIG. 1.

The automated overhead crane 42 transfers empty cassettes to the loading area 24 and loaded cassettes to the storage area 26. Access control is provided around the perimeter of the loading area; humans cannot enter the loading area when the automated crane is overhead and the overhead crane cannot overly the loading area when humans are therewithin. FIG. 6 shows a loaded cassette in the carriage of the overhead crane.

Splitting

Figure 7:
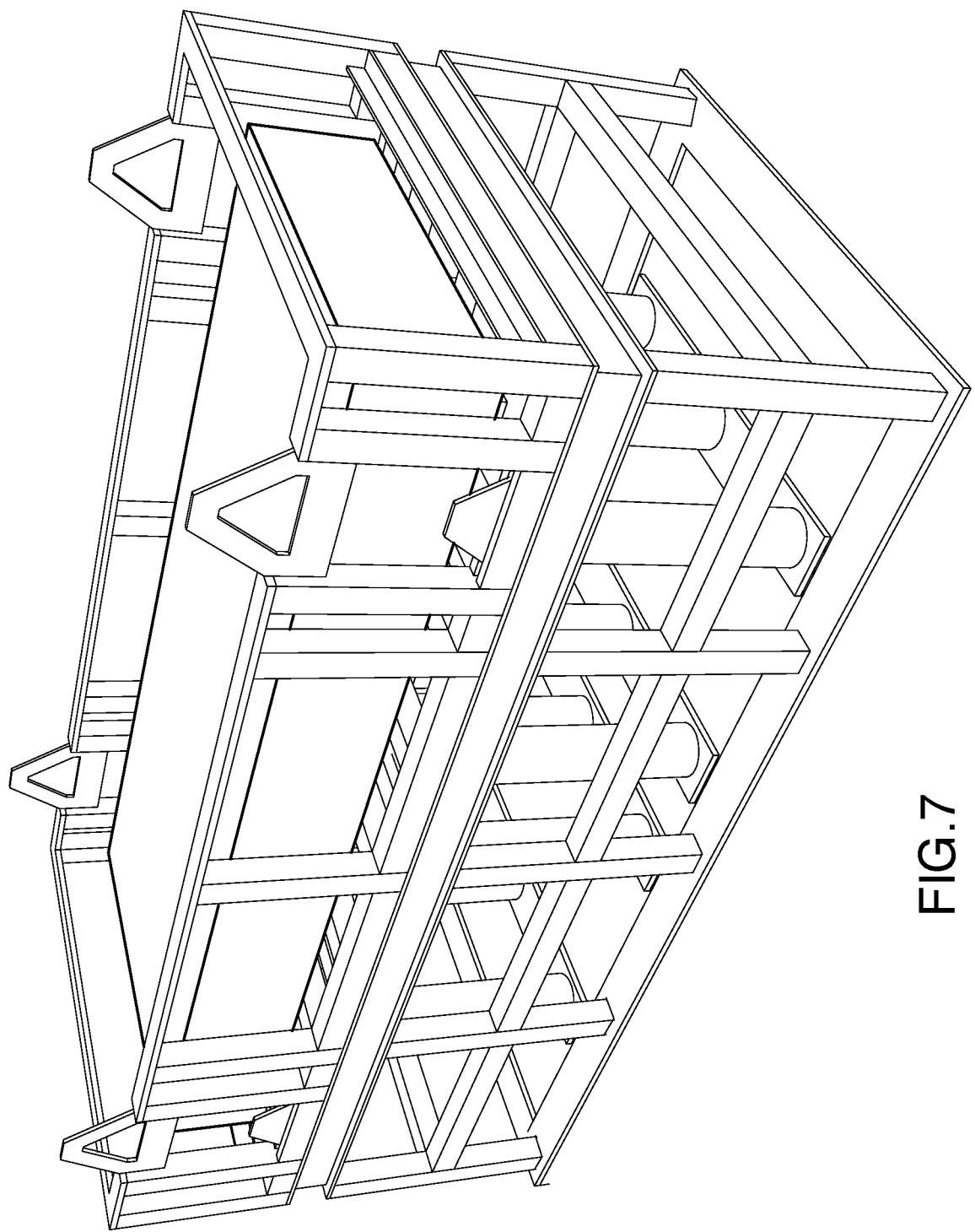
FIG. 7 is a view of the structure of FIG. 4 in use with the structure of FIG. 3 and with a stack of sheet steel.
Figure 8:
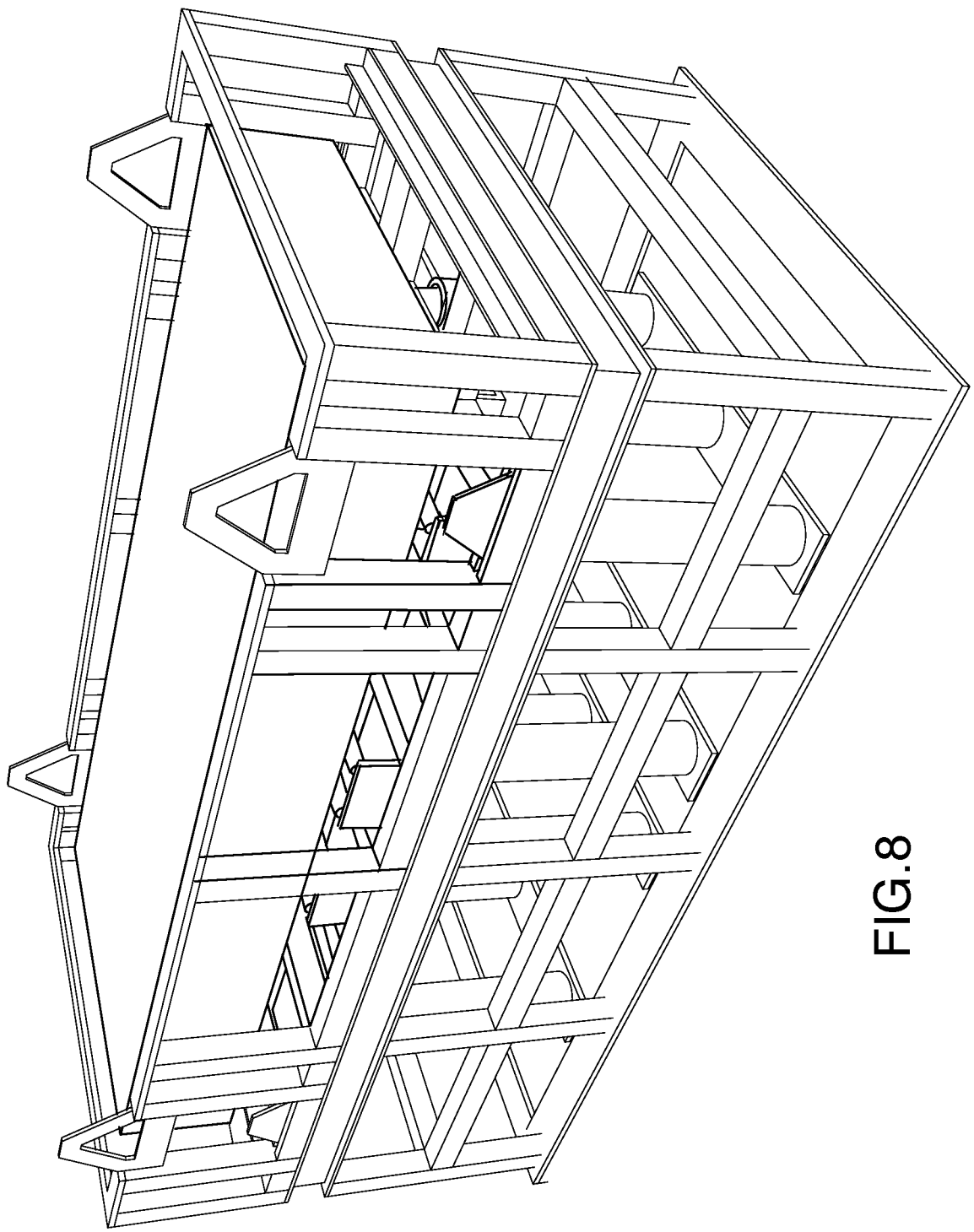
FIG. 8 is a view of the structure of FIG. 7 with the rollers raised.
Figure 9:
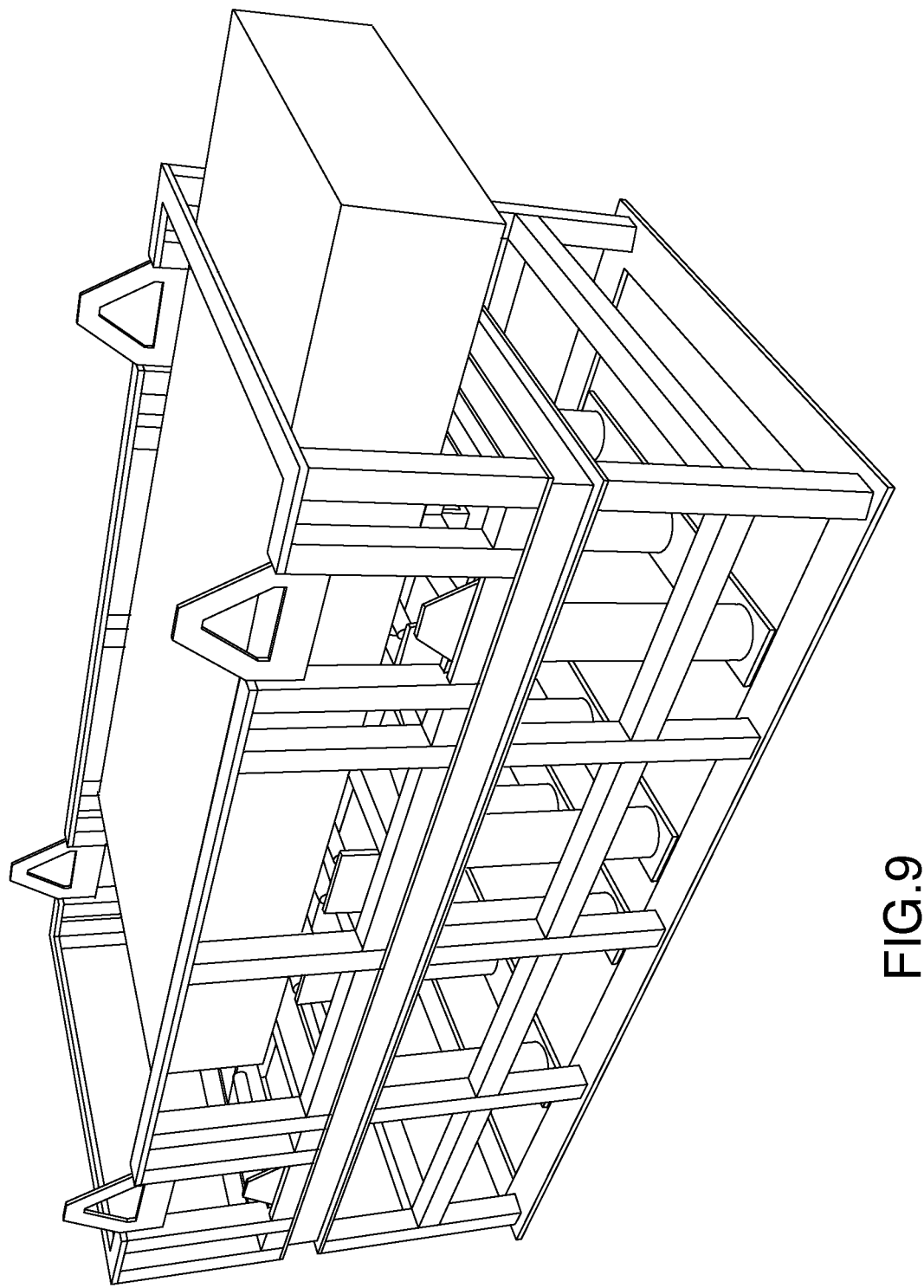
FIG. 9 is a view similar to FIG. 8 with the stack partially ejected.

The contents of a cassette are split by delivery, by the automated crane, of the cassette to one of the transfer areas 32 in the transition zone, as shown by FIG. 7. So positioned, the rollers of the lifter 48 will be at the lowered position, beneath the package, and the rollers of the adjacent conveyor 50 will lead to the aperture 64 of the cassette. The rollers of lifter 48 are raised to an elevated position, as shown in FIG. 8, whereat the rollers protrude through the apertures 62 of the cassette to form an extension of the adjacent conveyor. Thereafter, the rollers drive the package onto the adjacent conveyor, as indicated by the sequence of FIGS. 8 and 9. The package is then passed by such conveyor to the adjacent turntable 52, optionally through a further combination of conveyor 50 and turntable 52, and ultimately on to a final conveyor 50 that communicates with the lifters 48 of the splitting subfacility 38.

In this embodiment, splitting is done manually, by moving sheets from the package to a pallet. To minimize effort, this is done through a pair of adjacent lifters, to minimize the elevation difference between the sheet being removed from the package and the pallet onto which the sheet is to be loaded. Once the pallet has been suitably loaded, the pallet is passed to the conveyors 50 within reach of the manual overhead crane, banded and removed by the overhead crane to a truck in the bay 34 or the shipping area 28, as appropriate. If only a portion of the cassette has been loaded onto a pallet, the remainder is returned to a cassette, using a reversal of the process indicated above, and then returned to storage. If the intent of the transfer was to fully empty the cassette, the cassette from which the material was removed is automatically stored by the overhead crane either within the transition zone or the storage area.

It has been found, surprisingly, that if the line is operated with a view to maximum throughput, the production costs benefit outweigh the incremental costs of carrying the inventory and splitting the production, resultant from the relatively low amounts of floor space occupied by the inventory and the relatively low cost at which it can be accessed by virtue of the automated crane.

Whereas a specific embodiment has been hereinbefore described, it will be evident that variations are possible.

Figure 10:
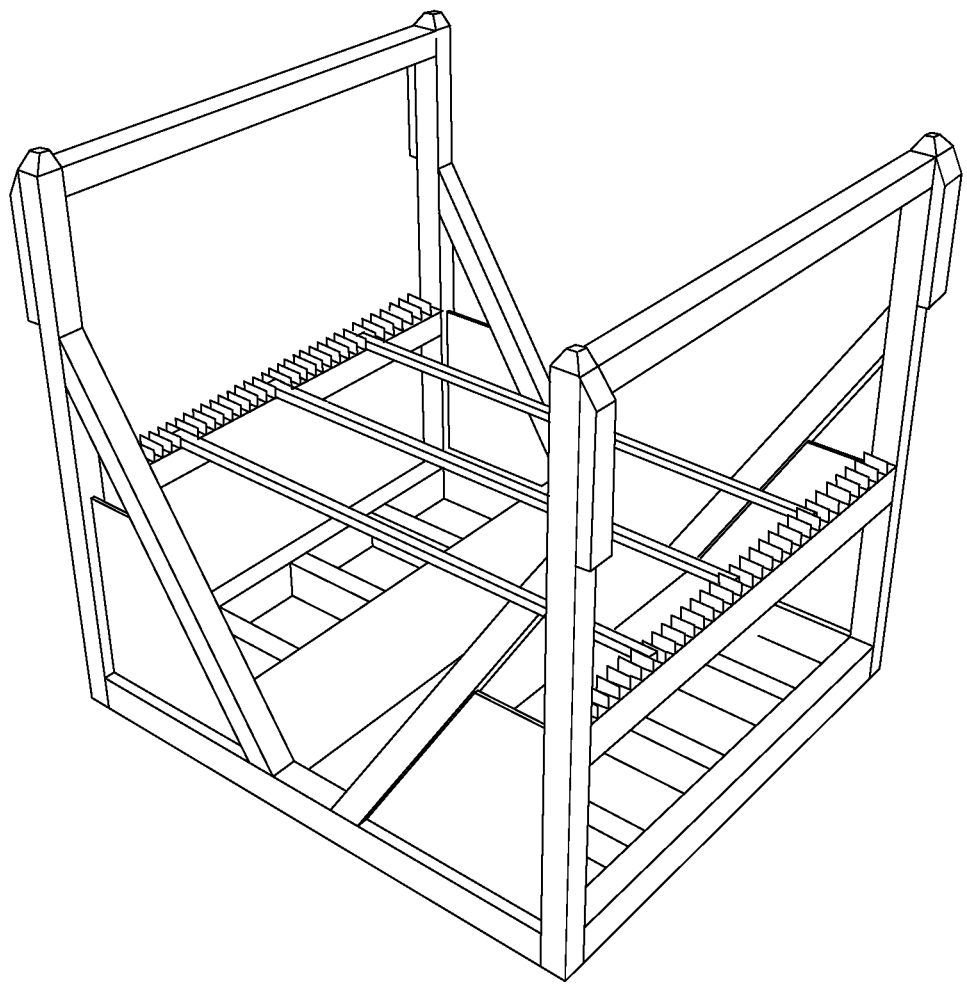
FIG. 10 is a view of an alternate embodiment of the structure of FIG. 3.
Figure 11:
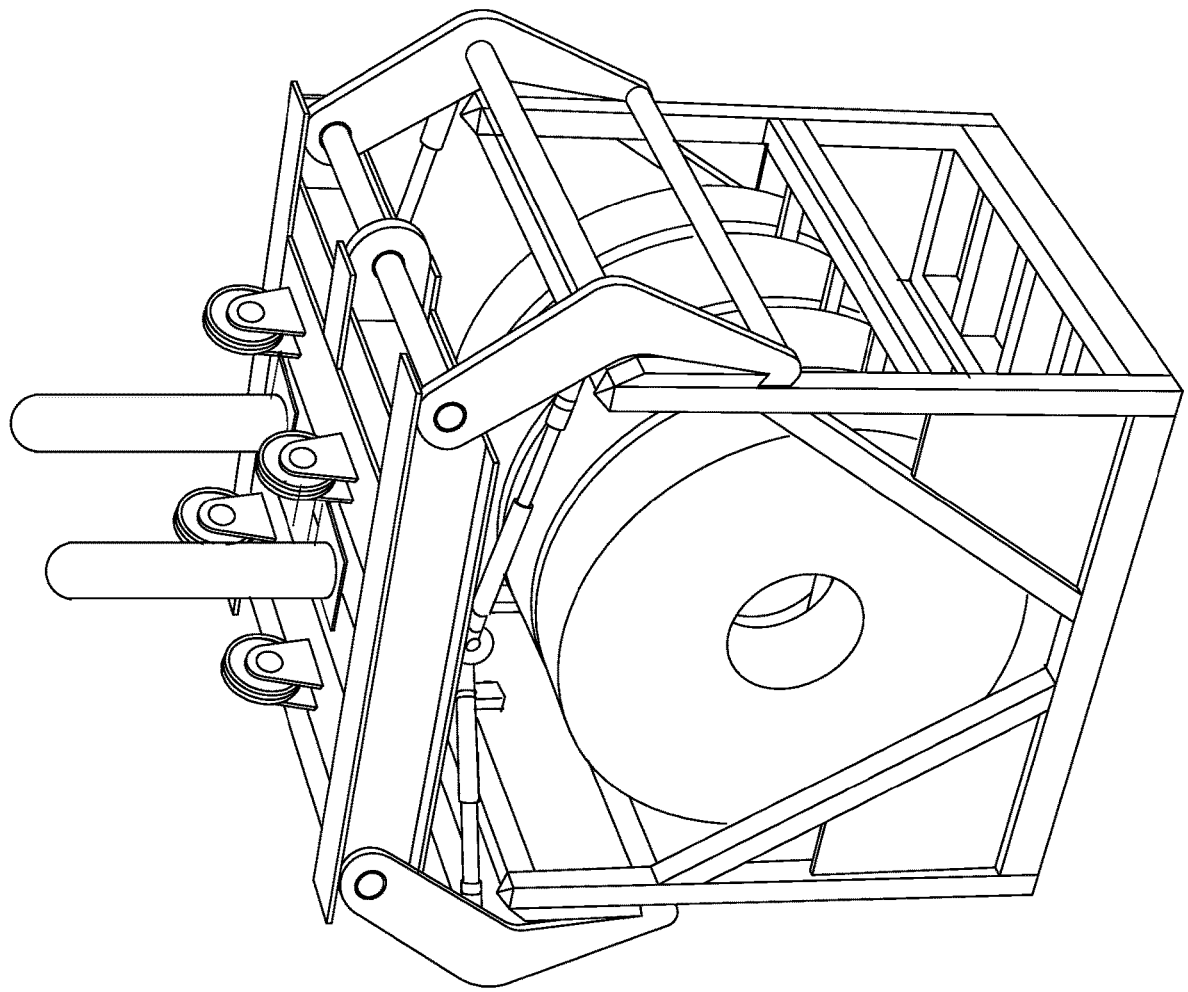
FIG. 11 is a view of an alternate embodiment of the structure of FIG. 6.

For example, only, whereas the exemplary embodiment handles stacks of steel, the invention can be embodied for use with a slitter by providing:

cassettes that handle multiple coils, as shown by FIG. 10;
overhead cranes adapted for carriage thereof as shown by FIG. 11;
a splitter subfacility adapted to receive a cassette, remove and package for shipment at least some of such contents and returning the cassette; and
automated transfer apparatus for moving a cassette in the transfer position to the splitter subfacility and for moving a cassette from the splitter subfacility to the transfer position.

Figure 12:
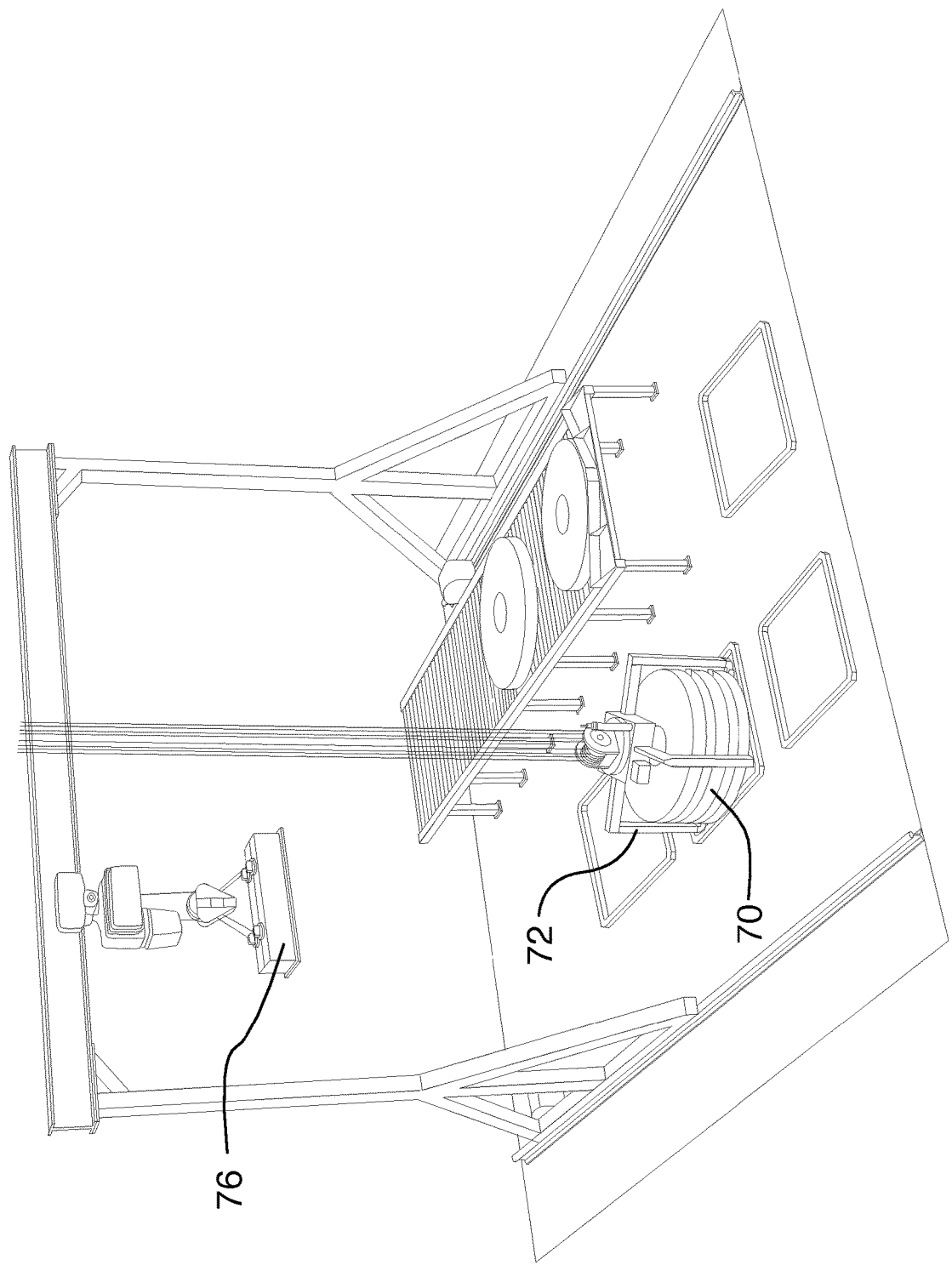
FIG. 12 is a view of an alternate embodiment of a stack, a lifter for the stack and a splitter subfacility for splitting the stack.
Figure 13:
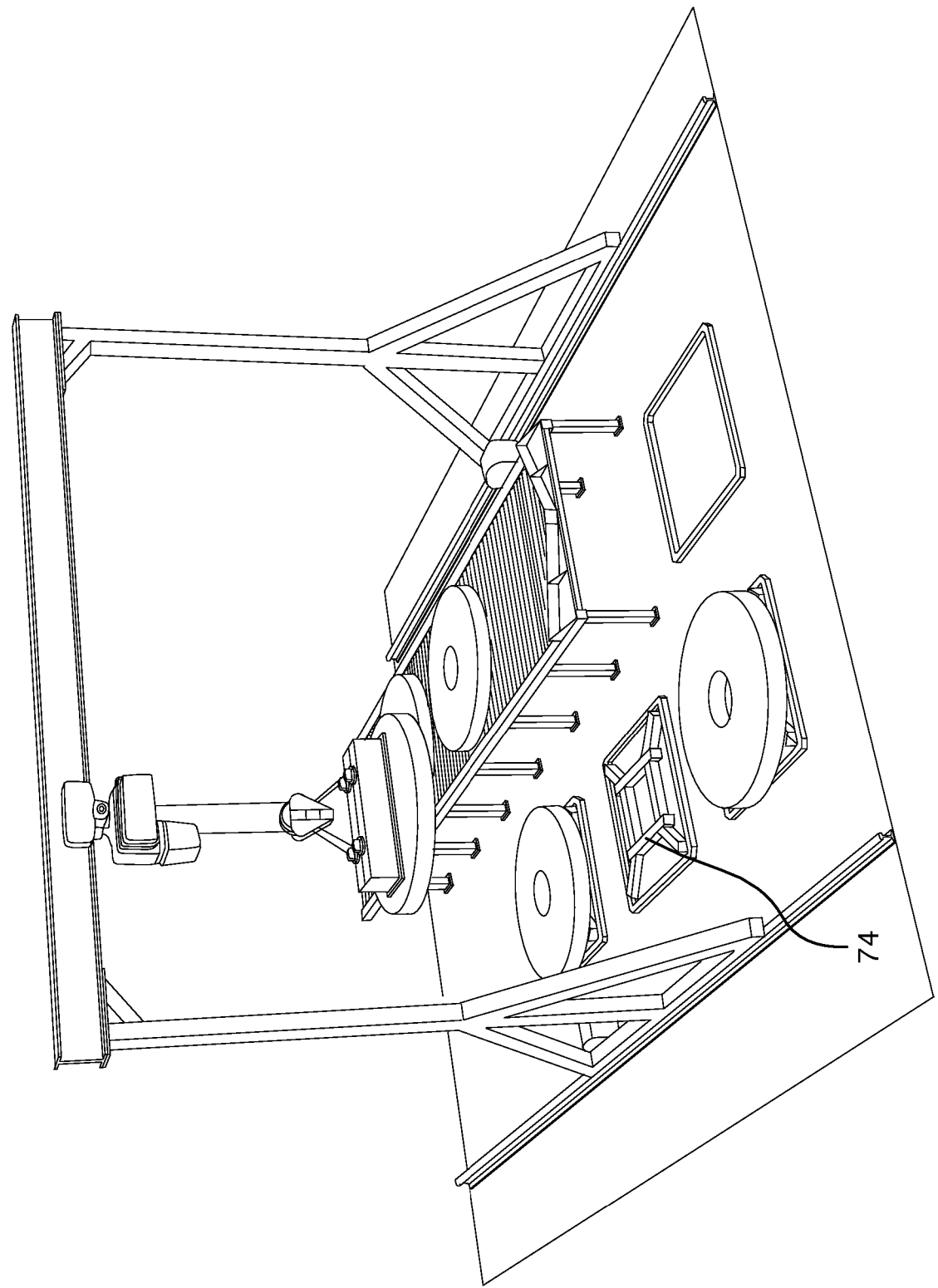
FIG. 13 is a view of a pallet used in the embodiment of FIG. 12.

As an alternative to the cassettes above, split coils could also be stored in stacks 70, as shown in FIG. 12, either in cassettes of the general type shown in FIG. 3 or in isolation. Cassettes loaded with split coils could be moved with an overhead crane in the manner indicated above and unloaded with the lifter indicated above. Stacks of the type shown in FIG. 12 could alternatively be moved with a four arm pallet lifter 72, as indicated in FIG. 12, if positioned upon a pallet such as that shown in FIG. 13. Splitting can be done with the four arm pallet lifter or, one slit coil at a time, with a magnetic lifter 76, as shown in FIG. 12.

Other variations can also be provided, for example, secondary inspection could be provided by providing another access controlled area, similar to the loading area.

Accordingly the invention should be understood to be limited only by the accompanying claims, purposively construed.

The invention claimed is:

1. A facility comprising:
    a cut-to-length line for producing packages, the packages being stacks of steel sheets;
    a plurality of stackable cassettes, each cassette having a plurality of apertures in a base thereof and being adapted to receive at least one package;
    premises including a loading area in which packages from the line are loaded into cassettes, a storage area in which cassettes are stored and a transition zone including at least one transfer position;
    a splitter subfacility for: receiving a contents of a cassette, removing and packaging for shipment at least some of such contents and returning the remainder; or receiving a cassette, removing and packaging for shipment at least some of such contents and returning the cassette;
    automated transfer apparatus for moving the contents of a cassette disposed at the transfer position to the splitter subfacility and for moving a package from the splitter subfacility to a cassette in the transfer position, the automated transfer apparatus comprising:
        a conveyor having a plurality of rollers over which packages pass to and from the splitter subfacility, and
        a lifter having a plurality of rollers, the rollers having a lowered position whereat, when a cassette, loaded with a package, is at the transfer position, the rollers are beneath the package, and having a raised position, whereat the rollers protrude through the apertures of the cassette to form an extension of the conveyor adapted to deliver packages to the conveyor and to receive packages from the conveyor; and
    an automated overhead crane extending over the storage area, the loading area and the transition zone and adapted to move cassettes therebetween.

2. A facility according to claim 1, further comprising a manual overhead receiving crane for moving packages from the line to the loading area and wherein the facility is adapted to arrest movement of the automated overhead crane in the loading area, if a human is in the loading area.

3. A facility according to claim 2, further comprising a receiving area for receiving packages from the line and wherein the manual overhead crane is adapted to move packages from the receiving area to the loading area.

4. A facility according to claim 1, further comprising:
    a bay for receiving trucks; and
    a manual overhead shipping crane for moving packages from the splitting subfacility to the bay.

5. A facility according to claim 1, further comprising:
    a shipping area; and
    a manual overhead shipping crane for moving packages from the splitting subfacility to the shipping area.

6. A facility according to claim 1, wherein each cassette defines a hollow and defines, at each end of the hollow, an aperture, the aperture providing for communication between the rollers of the lifter when in the raised position and the rollers of the conveyor.

* * * * *